United States Patent [19]

Meier et al.

[11] Patent Number: 4,619,838
[45] Date of Patent: Oct. 28, 1986

[54] PROCESS FOR THE DEPOSITION OF METALS ON SEMICONDUCTOR POWDERS

[75] Inventors: Kurt Meier, Allschwil; Niklaus Bühler, Rheinfelden; Jean-Francois Reber, Riehen, all of Switzerland

[73] Assignee: Ciba-Geigy Corporation, Ardsley, N.Y.

[21] Appl. No.: 780,158

[22] Filed: Sep. 26, 1985

Related U.S. Application Data

[63] Continuation of Ser. No. 666,127, Oct. 30, 1984, Pat. No. 4,559,237, which is a continuation of Ser. No. 456,888, Jan. 10, 1983, abandoned.

[30] Foreign Application Priority Data

Jan. 15, 1982 [CH] Switzerland .................. 241/82

[51] Int. Cl.$^4$ .............................. B05D 3/06
[52] U.S. Cl. ............................ 427/53.1; 204/157.15; 427/54.1; 427/217
[58] Field of Search .............. 427/53.1, 54.1, 217; 204/157.15

[56] References Cited

U.S. PATENT DOCUMENTS 3,907,566  9/1975  Inoue et al. .
4,264,421  4/1981  Bard et al. .................. 427/54.1

FOREIGN PATENT DOCUMENTS 18499  11/1980  European Pat. Off. .

OTHER PUBLICATIONS

L. Kulynych et al, IBM Technical Disclosure Bulletin, 23, 1262 (1980).

Primary Examiner—John H. Newsome
Attorney, Agent, or Firm—Luther A. R. Hall

[57] ABSTRACT

Copper, lead, mercury, tin, gold, silver, palladium, osmium and/or cadmium can be deposited by photoredox reaction on semiconductor sulfide powders by irradiating a suspension of semiconductor sulfide powder in the presence of oxygen and optionally $CO_2$, of an oxidizable system which optionally protects the semiconductor from photocorrosion, and of a salt or complex of copper, lead, mercury, tin, gold, silver, palladium, osmium and/or cadmium.

11 Claims, No Drawings

PROCESS FOR THE DEPOSITION OF METALS ON SEMICONDUCTOR POWDERS

This application is a continuation of application Ser. No. 06/666,127 filed Oct. 30, 1984, now U.S. Pat. No. 4,559,237, which is a continuation of Ser. No. 06/456,888 filed Jan. 10, 1983, now abandoned.

The present invention relates to a novel process for the deposition of metals on semiconductor powders.

It is known from the literature that the deposition of metals on semiconductor powders such as ZnO, $TiO_2$ and $WO_3$ powders or on $TiO_2$ single crystals can be effected by photoredox reaction. Simple metal salts, e.g. hexachloroplatinic acid, silver perchlorate, copper sulfate and palladium chloride, have been employed as metal compounds. In these known processes, it is necessary to carry out the reaction with the exclusion of oxygen. Any $CO_2$ formed during the reaction is conveniently removed by bubbling in nitrogen. Reference is made in this connection to e.g. the following publications: JACS, 100:13, 4317 (1978), J. Phys. Chem. 83, 2248 (1979), J. Phys. Chem., 85, 268 (1981) and Bull. Chem. Soc. Japan, 51, 3154 (1978).

It is also known that certain semiconductor powders such as ZnO, ZnS, $Bi_2S_3$, $FeTiO_3$ or $Fe_2TiO_4$, slowly decompose when irradiated in purely aqueous medium [see Solar Energy 20, 443 (1978)].

This invention relates to a novel process for the deposition of copper, lead, mercury, tin, gold, silver, palladium, osmium and/or cadmium on semiconductor powders by means of photoredox reaction, which process comprises irradiating a suspension of a semiconductor powder in the presence of oxygen and optionally $CO_2$, of an oxidisable system which optionally protects the semiconductor from photocorrosion, and of a salt or complex of copper, lead, mercury, tin, gold, silver, palladium, osmium and/or cadmium.

The process of the invention is, on the one hand, simple and economic, as it permits very complicated and expensive steps and apparatus for excluding oxygen and $CO_2$ to be dispensed with, and it can be carried out in open systems, e.g. in settling tanks and the like. In addition, the process of the invention makes possible a very comprehensive extraction of the above mentioned metals even from highly dilute solutions or suspensions, in general to a concentration of below 0.1 ppm and, in the case of silver, even of 50 ppb. The process is also suitable for the extraction of metal complexes such as $Ag(S_2O_3)_2^{3-}$, which cannot be precipitated by conventional gravimetric methods. It is also surprising that, in the process of the invention, metals having a more negative reduction potential than that of oxygen, e.g. silver, palladium, osmium and cadmium, are able to precipitate in the presence of oxygen.

Examples of suitable oxidisable systems which may be used in the process of this invention are: water, alkanols containing up to 6 carbon atoms such as methanol, ethanol, propanol, isopropanol, butanols and hexanols, mixtures of water and alkanols of the above kind or other organic solvents such as aliphatic or cyclic ethers, e.g. diethyl ether, diisopropyl ether, tetrahydrofuran, dioxan or cellosolve, mixtures of water and alkali metal sulfites or sulfides, alkaline earth metal sulfites or sulfides, or ammonium sulfides or sulfites, or acetate. Examples of suitable alkali metals and alkaline earth metals are Na, K, Li, Mg, Ca and Ba. Ammonium sulfites and sulfides and alkali metal sulfites or sulfides in admixture with water are preferred, especially mixtures of water and sodium sulfite or ammonium sulfite.

It is particularly preferred to carry out the process of the invention in water or in water containing acetate buffer or sodium sulfite. The reaction temperature is ordinarily in the range from 0° to 40° C., with room temperature being most preferred.

The semiconductor powders which may be used in the process of this invention are e.g. powders of $TiO_2$, $WO_3$, $SnO_2$, $SrTiO_3$, $Fe_2O_3$, $Nb_2O_5$, $Ta_2O_5$, $KTaO_3$, $ZrO_2$, ZnO, $CaTiO_3$, ZnS, $Bi_2S_3$, $BaTiO_3$, $Fe_2TiO_3$, $Fe_2TiO_5$, $YFeO_3$ or $KTa_{0.77}Nb_{0.23}O_3$. It is particularly preferred to use $TiO_2$, $WO_3$, $Fe_2O_3$, $SrTiO_3$, $Ta_2O_5$, $SnO_2$, ZnS, $Nb_2O_5$ or $FeTiO_3$ powder. Zinc sulfide powder and titanium dioxide powder (anatase modification) are most preferred.

If ZnS, ZnO, $Bi_2S_3$, $FeTiO_3$ or $Fe_2TiO_3$ is used as semiconductor powder, then the oxidisable system is preferably not water.

The specific surface area of the semiconductor powders may vary within a wide range and depends largely on the nature of the semiconductor. The semiconductor powders employed in the process of the invention conveniently have a specific surface area of 0.1 to 50 $m^2/g$, preferably of 1 to 10 $m^2/g$.

In general, semiconductor powders of so-called technical quality may be used. When using titanium dioxide powder, it will be generally preferred to use the anatase modification.

The semiconductor powders may be used in any amount. One advantage of the process of this invention is that, in general, small amounts of semiconductor powder suffice for a comprehensive extraction of the metals. The semiconductor powders will conveniently be used in an amount of 0.05 to 5, preferably 0.1 to 2, grams per 100 ml of reaction volume.

The metals to be deposited can be in the form of simple or complex salts, e.g. ammonium and alkali metal hexahalo- or tetrahalometallates, halides, nitrates, acetates, cyanides, sulfates or thiosulfates. Examples of suitable metal compounds or salts are: silver acetate, silver nitrate, silver thiosulfate, palladium chloride or palladium iodide, palladium acetate, palladium cyanide and palladium nitrate, lithium tetrachloropalladate(II), gold(III)chloride, gold(III)bromide and gold(III)iodide, ammonium hexachloroosmate(IV), osmium tetroxide ($OsO_4$), cadmium acetate and cadmium chloride. The metals are preferably salts or complexes of gold, silver, palladium, osmium and/or cadmium, in particular palladium or cadmium salts or complexes and, most particularly, silver salts or complexes.

As light source there may be used in the process of this invention any light of wavelength from about 200 to 650 nm, depending on the semiconductor. Suitable light sources are sunlight or mercury high pressure lamps which may be doped with metal atoms, xenon vapour lamps, mercury xenon lamps, mercury low and medium pressure lamps, halogen lamps, tungsten lamps and $D_2$ lamps. Irradiation is preferably carried out with sunlight or with a mercury high pressure lamp.

The process of this invention is suitable for recovering copper, lead, mercury, tin, gold, silver, palladium, osmium and cadmium from all manner of wastewaters and solutions which occur in industry or in chemical reactions, e.g. photographic developer, bleaching and fixing solutions, hydrogenation solutions and the like, or also for the recovery or metals such as gold and silver from aqueous systems.

Up to 10% by weight of metal can be deposited on the semiconductor powders in the process of the invention. The deposited metal may be easily separated from the semiconductor powders, e.g. by treatment with oxidation agents such as $HNO_3$, $H_2SO_4$ and $Na_2O_2$, and the semiconductor powders may be reused.

The invention is illustrated by the following Examples.

EXAMPLE 1

1 g of titanium dioxide (anatase modification, specific surface area 8 m$^2$/g) is suspended in a solution of 50 mg of silver acetate in 90 ml of distilled water and 10 ml of acetate buffer solution. With stirring, the suspension is irradiated for 2 hours in an open vessel through a Pyrex immersion rod with a 125 W mercury high pressure lamp, whereupon the colour of the suspension turns dark grey. The suspension is then filtered and the filter cake is washed with water and dried for 24 hours at 80° C./13,000 Pa, affording 1 g of a dark grey powder. Silver content: 3.1% by weight.

EXAMPLE 2

The procedure of Example 1 is repeated, using 190 ml of distilled water and 50 mg of silver acetate. The suspension is irradiated for 2 hours with sunlight (intensity of irradiation 500 W/m$^2$ at vertical incidence of light, measured with a YSI thermopile). Yield: 1 g of a grey powder. Silver content: 3% by weight.

EXAMPLE 3

The procedure of Example 1 is repeated, using 50 mg of silver nitrate instead of 50 mg of silver acetate. Yield: 1 g of a dark grey powder. Silver content: 3.1% by weight.

EXAMPLE 4

The procedure of Example 2 is repeated using 450 ml of a photographic wastewater instead of the silver acetate/acetate buffer solution. The photographic wastewater consists of developer solution, bleaching bath, fixing bath and wash water and contains 10 ppm of Ag. Yield: 1 g of a dark grey powder with a silver content of 0.4% by weight. 1.6 ppm of silver remain in the solution.

EXAMPLE 5

The procedure of Example 2 is repeated, using 1 g of tin dioxide (specific surface area 5.96 m$^2$/g) instead of 1 g of titanium dioxide. A greyish powder with a silver content of 2.8% by weight is obtained.

EXAMPLE 6

The procedure of Example 2 is repeated, using 1 g of tungsten trioxide (specific surface area 3.85 m$^2$/g) instead of 1 g of titanium dioxide. A greenish grey powder with a silver content of 1.3% by weight is obtained.

EXAMPLE 7

The procedure of Example 2 is repeated, using 1 g of strontium titanate (specific surface area 3.8 m$^2$/g). The greyish yellow powder obtained has a silver content of 3% by weight.

EXAMPLE 8

The procedure of Example 2 is repeated, using 1 g of a rutile modification of titanium dioxide (specific surface area 0.36 m$^2$/g). Yield: 1 g of greyish white powder with a silver content of 3.2% by weight.

EXAMPLE 9

The procedure of Example 1 is repeated, using 1 g of niobium pentoxide (specific surface area 1.51 m$^2$/g). Yield: 1 g of a grey powder with a silver content of 3.3% by weight.

EXAMPLE 10

The procedure of Example 1 is repeated, using 1 g of tantalum pentoxide (specific surface area 2.45 m$^2$/g). Yield: 1 g of a grey powder with a silver content of 2.8% by weight.

EXAMPLE 11

1 g of titanium dioxide (anatase modification, specific surface area 8 m$^2$/g) is suspended in a solution of 75 mg of silver nitrate, 500 mg of sodium thiosulfate and 60 mg of sodium sulfite in 100 ml of water. The suspension is irradiated at room temperature in a photoreactor equipped with a 125 W mercury high pressure lamp, a magnetic stirrer and a water-cooled Pyrex immersion rod. Radiochemical determination is made by taking 1 ml samples, centrifuging off the titanium dioxide, and measuring the solution to $^{110m}$Ag activity.

| Irradiation time | Reaction rate/minute | Remarks |
|---|---|---|
| 0 | 102817 ± 239 | starting solution |
| 0 | 101453 ± 444 | starting solution after 1 hour in the dark |
| 30 seconds | 93035 ± 390 | warming up phase of the lamp |
| 1 minute | 74458 ± 180 | warming up phase of the lamp |
| 2 minutes | 22900 ± 65 | warming up phase of the lamp |
| 3 minutes | 8268 ± 71 | warming up phase of the lamp |
| 10 minutes | 2505 ± 21 | warming up phase of the lamp |
| 20 minutes | 674 ± 4 | warming up phase of the lamp |
| 1 hour | 305 ± 12 | warming up phase of the lamp |
| 2 hours | 211 ± 12 | warming up phase of the lamp |
| 3 hours | 151 ± 8 | warming up phase of the lamp |
| 4 hours | 118 ± 10 | warming up phase of the lamp |
| 5 hours | 124 ± 11 | warming up phase of the lamp |
| blank value | 18 ± 2 | sample without $^{110m}$Ag |

These radioactivity measurements show that the silver content of the solutions falls from an initial concentration of 50 ppm after 10 minutes to 1 ppm and after 4 hours to 50 ppb.

EXAMPLE 12

The procedure of Example 2 is repeated, using 1 g of iron titanate (specific surface area 0.45 m$^2$/g). A red powder with a silver content of 1.2% by weight is obtained.

EXAMPLE 13

The procedure of Example 2 is repeated, using 50 mg of lithium tetrachloropalladate(II). A grey powder with a palladium content of 2% by weight is obtained.

EXAMPLE 14

The procedure of Example 2 is repeated, using 50 mg of gold(III)chloride. The blue violet powder obtained has a gold content of 2% by weight.

EXAMPLE 15

0.4 g of titanium dioxide (anatase modification, specific surface area 8 m$^2$/g) is suspended in a solution of 20 mg of ammonium hexachloroosmate(IV) in 90 ml of distilled water and 10 ml of acetate buffer solution. This suspension is then irradiated for 3 hours at room temperature in a photoreactor equipped with a 125 W mercury high pressure lamp, a magnetic stirrer and a water-cooled immersion rod, whereupon the colour of the suspension turns dark grey. The suspension is filtered and the filter cake is washed with water and dried for 24 hours at 80° C./13000 Pa, affording 0.4 g of a dark grey powder with an osmium content of 0.57% by weight.

EXAMPLE 16

1 g of ZnS (specific surface area 38.5 m$^2$/g) is suspended in a solution of 20 mg of cadmium acetate in 100 ml of a 10% aqueous solution of sodium sulfite. This suspension is then irradiated for 2 hours at room temperature in a photoreactor equipped with a 125 W mercury high pressure lamp, a magnetic stirrer and a water-cooled immersion rod, whereupon the colour of the suspension turns grey. The suspension is filtered and the filter cake is washed with water and dried for 24 hours at 80° C./13000 Pa, affording 1 g of a grey powder with a cadmium content of 1.2% by weight.

EXAMPLE 17

The procedure of Example 16 is repeated, using 20 mg of cadmium acetate in 100 ml of water and without addition of sodium sulfite. Yield: 1 g of a grey powder with a cadmium content of 0.78% by weight. Cadmium content of the filtrate: 0.8 ppm (blank value before irradiation=65 ppm).

EXAMPLE 18

The procedure of Example 1 is repeated, using 20 mg of osmium tetroxide, to give 1 g of a grey powder with an osmium content of 0.84% by weight. Osmium content of the filtrate: 20 ppm.

EXAMPLES 19-22

1 g of ZnS (specific surface area 38.5 m$^2$/g) is suspended in a solution of 20 mg of a metal salt listed in the following table and 1 g of sodium sulfite in 100 ml of water. This suspension is irradiated for 1 hour at room temperature in a photoreactor equipped with a 125 W mercury high pressure lamp, a magnetic stirrer and a water-cooled Pyrex immersion rod. Each suspension is filtered and the filter cake is dried for 24 hours at 80° C./13000 Pa. The respective metal content of the ZnS powder and that of each filtrate is indicated in the table.

TABLE

| Example No. | metal salt | % by weight of metal on ZnS | ppm of metal in the filtrate |
| --- | --- | --- | --- |
| 19 | Pb(CH$_3$COO)$_2$.3H$_2$O | 1.1 | 5 |
| 20 | CuSO$_4$.5H$_2$O | 0.59 | less than 5 |
| 21 | Hg(CH$_3$COO)$_2$ | 1.0 | 6.5 |
| 22 | SnCl$_2$.2H$_2$O | 1.3 | 8.5 |

What is claimed is:

1. A process for the deposition of copper, lead, mercury, tin, gold, silver, palladium, osmium, cadmium or mixtures thereof on a semiconductor sulfide powder selected from the group consisting of ZnS and Bi$_2$S$_3$, which process comprises
   irradiating a suspension of said semiconductor powder in an open system, in the presence of oxygen, CO$_2$ or mixtures thereof, of an oxidizable medium, which protects the semiconductor from photocorrosion, and of a copper, lead, mercury, tin, gold, silver, palladium, osmium, cadmium salt or complex, or mixture thereof.

2. A process according to claim 1 wherein the semiconductor powder is present in an amount of 0.05 to 5 grams per 100 ml of reaction volume.

3. A process according to claim 1 wherein the semiconductor powder is present in an amount of 0.1 to 2 grams per 100 ml of reaction volume.

4. A process according to claim 1 for the deposition of gold, silver, palladium, osmium, cadmium or mixture of thereof on semiconductor powders, wherein the irradiation is carried out in the presence of a salt or complex of gold, silver, palladium, osmium, cadmium or mixtures thereof.

5. A process according to claim 1, wherein the oxidisable medium consists of water, alkanols containing up to 6 carbon atoms, mixtures of water and alkanols containing up to 6 carbon atoms, mixtures of water and alkali metal sulfites or sulfides, alkaline earth metal sulfites or sulfides, or ammonium sulfites or sulfides, or acetate.

6. A process according to claim 1, wherein the reaction is carried out in water or in water containing acetate buffer or sodium sulfite.

7. A process according to claim 1, wherein ZnS powder is used.

8. A process according to claim 1, wherein the oxidisable system is not water if ZnS, or Bi$_2$S$_3$, FeTiO$_3$ or powder is used.

9. A process according to claim 1, wherein the reaction medium contains a salt or a complex of palladium or cadmium.

10. A process according to claim 1, wherein the reaction medium contains a salt or a complex of silver.

11. A process according to claim 1, wherein irradiation is carried out with sunlight or with a mercury high pressure lamp.

* * * * *